(12) United States Patent
Hiraoka et al.

(10) Patent No.: US 10,181,209 B2
(45) Date of Patent: Jan. 15, 2019

(54) DISPLAY DEVICE FOR VEHICLE

(71) Applicant: YAZAKI CORPORATION, Tokyo (JP)

(72) Inventors: Osamu Hiraoka, Shizuoka (JP); Yasushi Katayama, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 201 days.

(21) Appl. No.: 14/700,854

(22) Filed: Apr. 30, 2015

(65) Prior Publication Data

US 2015/0235404 A1    Aug. 20, 2015

Related U.S. Application Data

(63) Continuation of application No. PCT/JP2013/080031, filed on Nov. 6, 2013.

(30) Foreign Application Priority Data

Nov. 8, 2012  (JP) ................. 2012-246451

(51) Int. Cl.
  *G06T 11/60*    (2006.01)
  *B60R 1/00*    (2006.01)
  *G06T 1/20*    (2006.01)

(52) U.S. Cl.
  CPC ............... *G06T 11/60* (2013.01); *B60R 1/00* (2013.01); *G06T 1/20* (2013.01)

(58) Field of Classification Search
  None
  See application file for complete search history.

(56) References Cited

U.S. PATENT DOCUMENTS

| 4,711,544 | A | * | 12/1987 | Iino ................. G02B 27/01 345/7 |
| 5,136,516 | A | * | 8/1992 | Twombly ............... B61C 17/04 246/1 C |
| 6,226,588 | B1 |  | 5/2001 | Teramura et al. |
| 6,324,465 | B1 |  | 11/2001 | Teramura et al. |
| 6,721,634 | B1 |  | 4/2004 | Hauler et al. |
| 6,728,605 | B2 | * | 4/2004 | Lash ................. B60K 31/0058 340/438 |
| 6,778,074 | B1 | * | 8/2004 | Cuozzo .................. G01D 7/00 340/441 |

(Continued)

FOREIGN PATENT DOCUMENTS

| JP | 10-9938 A | 1/1998 |
| JP | 2000-118263 A | 4/2000 |

(Continued)

OTHER PUBLICATIONS

International Preliminary Report on Patentability and English language Written Opinion of the International Search Report for PCT/JP2013/080031 dated May 12, 2015.

(Continued)

*Primary Examiner* — Hilina K Demeter
(74) *Attorney, Agent, or Firm* — Kenealy Vaidya LLP

(57) ABSTRACT

A display system is a display system which is installed in a vehicle and includes a liquid crystal display unit which outputs information representing a deviation amount of the current running speed of the vehicle from a speed limit set for an area where the vehicle is currently running.

1 Claim, 4 Drawing Sheets

(56) References Cited

U.S. PATENT DOCUMENTS

| | | | |
|---|---|---|---|
| 7,441,189 B2* | 10/2008 | Michaels | B63J 99/00 |
| | | | 715/700 |
| 8,509,971 B1* | 8/2013 | Isailovski | B61L 15/009 |
| | | | 246/182 A |
| 8,515,457 B2* | 8/2013 | Cai | H04W 64/006 |
| | | | 340/441 |
| 2001/0035818 A1 | 11/2001 | Kabatek et al. | |
| 2002/0186228 A1* | 12/2002 | Kobayashi | B60K 35/00 |
| | | | 345/633 |
| 2007/0001830 A1* | 1/2007 | Dagci | B60K 31/185 |
| | | | 340/438 |
| 2007/0193356 A1* | 8/2007 | Cook | B60K 37/02 |
| | | | 73/528 |
| 2009/0066539 A1 | 3/2009 | Uemura et al. | |
| 2010/0121526 A1* | 5/2010 | Pham | B60W 30/146 |
| | | | 701/36 |
| 2010/0217477 A1* | 8/2010 | Brody | B60K 31/18 |
| | | | 701/31.4 |
| 2010/0302020 A1* | 12/2010 | Lenneman | B60K 35/00 |
| | | | 340/441 |
| 2011/0161004 A1* | 6/2011 | Chao | G01C 21/3697 |
| | | | 701/408 |
| 2011/0187550 A1* | 8/2011 | Ringenwald | B60K 35/00 |
| | | | 340/815.4 |
| 2012/0140080 A1* | 6/2012 | Taylor | B60C 23/0408 |
| | | | 348/148 |
| 2012/0306635 A1* | 12/2012 | Sato | B60K 37/02 |
| | | | 340/425.5 |
| 2013/0174773 A1* | 7/2013 | Nagara | B60K 37/02 |
| | | | 116/201 |
| 2014/0114575 A1* | 4/2014 | Alders | G01C 21/3655 |
| | | | 701/538 |
| 2015/0109756 A1* | 4/2015 | Choi | B60K 37/02 |
| | | | 362/23.01 |

FOREIGN PATENT DOCUMENTS

| | | |
|---|---|---|
| JP | 2000-343979 A | 12/2000 |
| JP | 2001-356029 A | 12/2001 |
| JP | 2003-512230 A | 4/2003 |
| JP | 2007-264774 A | 10/2007 |
| JP | 2010-175524 A | 8/2010 |

OTHER PUBLICATIONS

International Search Report for PCT/JP2013/080031 dated Feb. 10, 2014.

Japanese Office Action for the related Japanese Patent Application No. 2012-246451 dated Aug. 2, 2016.

* cited by examiner

DISPLAY DEVICE FOR VEHICLE

CROSS REFERENCE TO RELATED APPLICATIONS

This application is a continuation of PCT application No. PCT/JP2013/080031, which was filed on Nov. 6, 2013 based on Japanese patent application (patent application JP2012-246451) filed on Nov. 8, 2012, whose contents are incorporated herein by reference. Also, all the references cited herein are incorporated as a whole.

BACKGROUND OF THE INVENTION

1. Technical Field

The present invention relates to a display system.

2. Background Art

In general, a display system, such as a display device for a vehicle, which functions to display a visual read-out of speed information to the driver is installed in a vehicle.

Speed limits are set for roads on which vehicles are driven according to types of roads and segments of a road from the viewpoint of traffic safety. The driver grasps the current running speed of a vehicle he or she drives by looking at a display system of the vehicle and drives the vehicle so that the running speed remains equal to or slower than a speed limit set for the road on which the driver is driving the vehicle.

In contrast with the display system described above, Patent Literature JP-A-2007-264774 discloses an in-vehicle system (for example, a navigation system) which has a function to compare the current vehicle running speed with a speed limit set for the road on which the driver drives the vehicle to determine whether or not the running speed exceeds the speed limit and to warn the driver when the running speed exceeds the speed limit.

According to the in-vehicle system disclosed by Patent Literature JP-A-2007-264774, the driver is able to be advised to drive the vehicle safely by being warned when the vehicle running speed exceeds the speed limit.

In recent years, drivers have been encouraged more and more to do the safety driving.

SUMMARY

The invention has been made in view of these situations, and an object thereof is to provide a display system which can easily grasp a deviation of the current vehicle running speed from a speed limit.

The object of the invention is attained by the following configurations.

(1) A display system installed in a vehicle, comprising:
a display unit for displaying a deviation amount of a current running speed of the vehicle from a speed limit set for an area where the vehicle is currently being driven, wherein
the display unit outputs a ratio of a difference between the running speed and the speed limit to the speed limit by a scale display in which a point where the ratio is zero is used as an origin, with a scale division indicating a predetermined ratio of the difference between the running speed and the speed limit to the speed limit.

(2) The display system according to the above (1), wherein the display unit has a running speed display area which outputs information representing the current running speed of the vehicle and a deviation amount display area which outputs information representing the deviation amount.

In the display system of (1) above, the display unit displays the information representing the deviation amount of the current running speed of the vehicle from the speed limit for the area where the vehicle is driven. As a mode of displaying the deviation amount, there are raised, for example, a mode of displaying a value of a difference between the current running speed of the vehicle from the speed limit set for the area where the vehicle is driven as numerical information and a mode of displaying the value of the difference by, for example, displaying a graph so as for the value of the difference to be grasped visually. Consequently, the driver can easily grasp the deviation amount of the current running speed from the speed limit by looking at the display unit. As a result of this, according to the display device of (1) above, the driver can be encouraged to drive his or her vehicle while keeping the speed limit, whereby the safety driving can be promoted.

In addition, the deviation amount of the running speed from the speed limit is presented to the driver as the information by displaying the ratio of the difference between the running speed and the speed limit to the speed limit. Consequently, the driver can grasp the deviation amount of the current running speed from the speed limit by grasping the ratio based on the speed limit.

Furthermore, the ratio is displayed by the scale display in which the point where the ratio is zero is used as the origin, and therefore, the driver can grasp the value of the ratio more instinctively.

In the display system of (2) above, the information representing the current running speed of the vehicle and the information representing the deviation amount are displayed on the display unit. Consequently, the driver can grasp both the value of the current running speed and the deviation amount of the running speed from the speed limit by looking at the display unit.

According to the display system of the invention, it is possible to provide the display system which facilitates the grasping of the deviation of the running speed from the speed limit.

Thus, the invention has been described briefly. Further, the details of the invention will be clarified further by perusing a mode for carrying out the invention (hereinafter, referred to as an "embodiment") which will be described below by reference accompanying drawings.

DETAILED DESCRIPTION OF EMBODIMENTS

A specific embodiment regarding a display system of the invention will be described by reference to FIGS. 1 to 3.

A display system 100 according to the embodiment is installed for use in a vehicle which is driven on a road for which a speed limit is determined.

Figure 1:
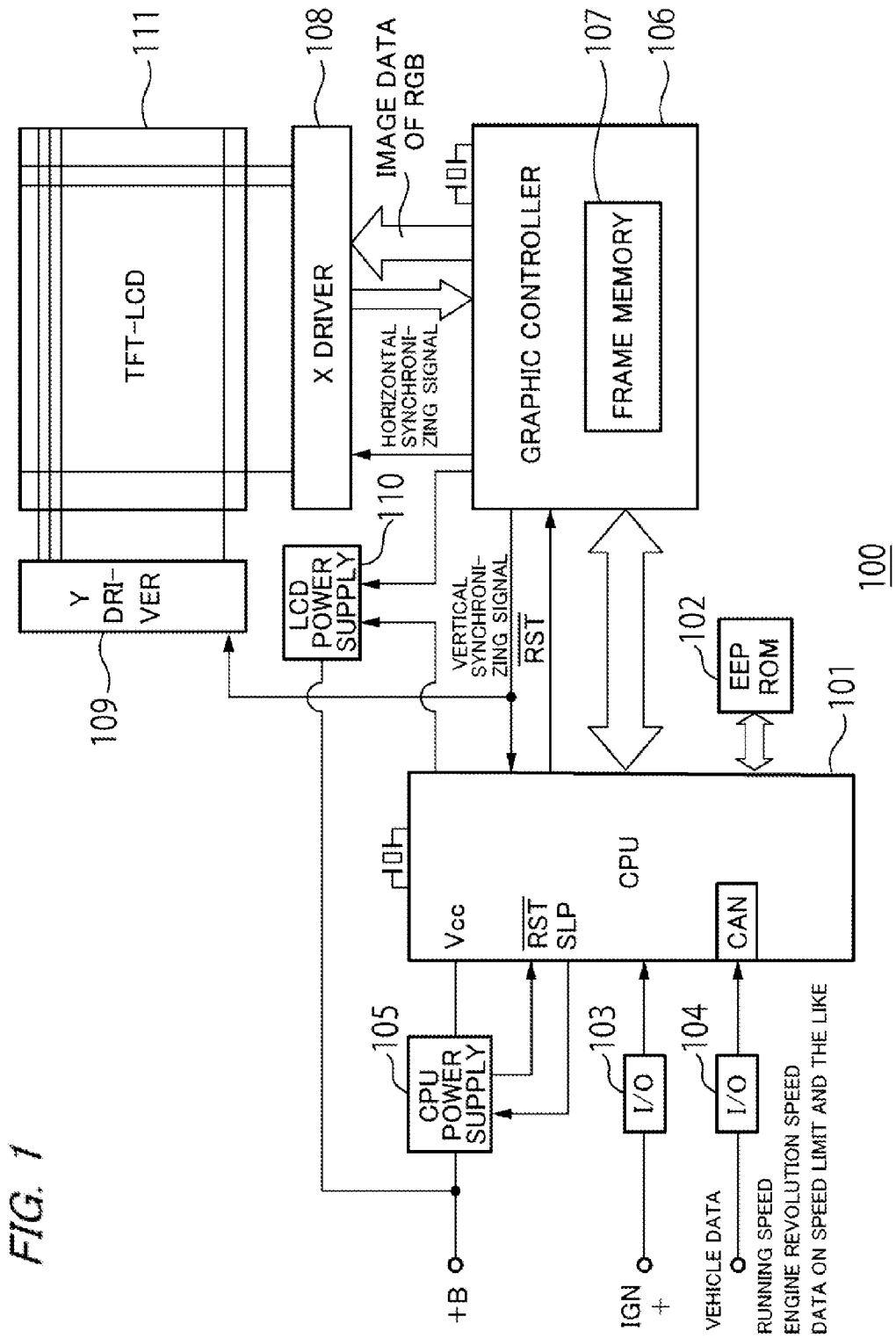
FIG. 1 is a block diagram showing an example of the configuration of hardware of a display system 100 according to an embodiment of the invention.

FIG. 1 shows an example of the configuration of hardware of the display system 100 of the embodiment.

As shown in FIG. 1, the display system 100 includes a microcomputer (CPU: Central Processing Unit) 101, a read-only memory (EEPROM: Electrically Erasable Programmable Read Only Memory) 102, an interface 103, an interface 104, a CPU power supply unit 105, a graphic controller 106, a frame memory 107, an X driver 108, a Y driver 109, an LCD (Liquid Crystal Display) power supply unit 110, and a liquid crystal display unit (TFT-LCD: Thin Film Transistor Liquid Crystal Display) 111.

The microcomputer 101 executes prepared programs to perform various necessary operations to realize a function of the display system 100. For example, the microcomputer 101 performs operations shown in a flowchart shown in FIG. 2, which will be described later. Namely, the microcomputer 101 functions as a control unit.

The read-only memory 102 holds the details of the programs which are executed by the microcomputer 101 and prepared fixed data. Namely, the read-only memory 102 functions as a storage unit.

The interface 103 inputs a signal (IGN+) which represents the state of a vehicle side ignition switch to the microcomputer 101.

The interface 104 is used to execute a communication based on the CAN (Controller Area Network) standard between the microcomputer 101 and various control units (ECUs: Electric Control Units). Specifically, data which represents the current various states of the vehicle such as the vehicle's current running speed, engine revolution speed, coolant temperature, whether the clutch is engaged or disengaged and the like is inputted to the microcomputer 101 from the vehicle side via the interface 104 as data of approximately real time. For example, in relation to the running speed, the interface 104 receives a vehicle speed pulse signal which is outputted from a speed sensor mounted on the vehicle every time the vehicle moves a predetermined distance and outputs it to the microcomputer 101 as running speed information which represents a value of the current running speed of the vehicle. Namely, the interface 104 functions as a vehicle information acquisition unit which acquires information representing the states of the vehicle.

In addition, the interface 104 receives speed limit information which represents a value of a speed limit set for an area (for example, a road) where the vehicle is currently running and outputs it to the microcomputer 101. More specifically, the interface 104 outputs, as the speed limit information, navigation information which is received from a navigation system mounted on the vehicle, VICS (registered trademark) (Vehicle Information and Communication System) information which is received from a road traffic information and communication system, ETC (Electronic Toll Collection System) gate information which is received from on-board ETC equipment and the like to the microcomputer 101. As will be described later, the microcomputer 101 specifies a value of the speed limit set for the area where the vehicle is currently running based on these pieces of speed limit information. Namely, the interface 104 also functions as a speed limit information acquisition unit which acquires the speed limit information.

The CPU power supply unit 105 inputs direct-current power which is supplied from a vehicle side positive power supply line (+B) to generate a direct-current voltage (Vcc) which is necessary for operation of the microcomputer 101.

Additionally, the CPU power supply unit 105 generates a reset signal as required and also acts to restrict the power supply according to a sleep signal which is outputted from the microcomputer 101.

The liquid crystal display unit 111 constitutes a display unit and has a color two-dimensional display screen in which a large number of microscopic display cells which are made of liquid crystal devices are arranged so that the cells are aligned in a direction X and a direction Y. The liquid crystal display unit 111 can display graphically desired information in the form of graphic, character, image or the like on the two-dimensional display screen by controlling individually the display states of the large number of microscopic display cells cell by cell.

Figure 3:
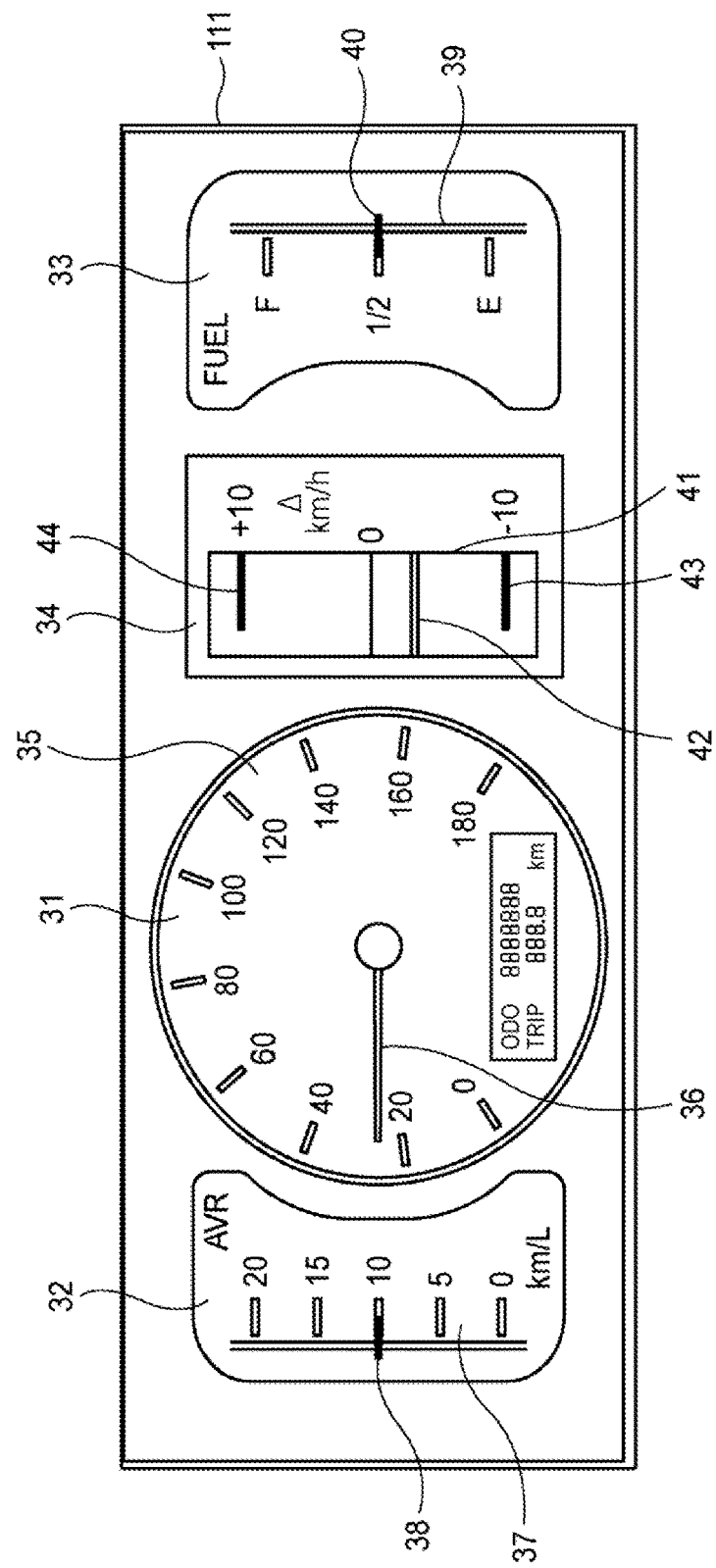
FIG. 3 is a view showing details of a display which is displayed on a liquid crystal display unit 111 of the display system 100 according to the embodiment.

The liquid crystal display unit 111 displays a graphic display screen as shown in FIG. 3 by a two-dimensional screen display. The graphic display screen has different display areas such as a first display area 31, a second display area 32, a third display area 33 and a fourth display area 34.

In this embodiment, although the individual display areas are described as being displayed on the graphic display screen, the display area or areas selected from the four display areas or all the display areas may be of an analog type.

The first display area 31 is an area where to display the current running speed of the vehicle (namely, a running speed display area). A speed scale 35 and a needle 36 are displayed on the first display area 31. The needle 36 points a portion of the speed scale 35 to indicate the current running speed of the vehicle.

The second display area 32 is an area where to display the current average fuel economy. A fuel economy scale 37 and a bar 38 are displayed on the second display area 32. The bar 38 points a portion of the fuel economy scale 37 to indicate the current average fuel economy.

The third display area 33 is an area where to display the current residual fuel amount. A fuel scale 39 and a bar 40 are displayed on the third display area 33. The bar 40 points a portion of the fuel scale 39 to indicate the current residual fuel amount.

The fourth display area 34 is an area where to display information representing a deviation amount of the current running speed of the vehicle from a speed limit set for an area where the vehicle is currently running (that is, a deviation amount display area). In this embodiment, on the forth display area 34, a value of a difference between the current running speed of the vehicle from a speed limit set for an area where the vehicle is running (hereinafter, in the description, the value of the difference between the running speed and the speed limit may be referred to as a speed difference from time to time) is displayed by a scale display which includes a scale and a bar which points a portion of the scale. Namely, as shown in FIG. 3, a speed difference scale 41 and a bar 42 are displayed on the fourth display area 34. The vertically extending speed difference scale 41 represents a speed difference in km/h as a unit. In the speed difference scale 41, a point where the speed difference is zero is used as an origin, and the origin is disposed at the center of the scale. A scale division 43 is provided at an upper portion which indicates that the speed difference is +10 km/h, while a scale division 44 is provided at a lower portion which indicates that the speed difference is −10 km/h. The bar 42 points a portion of the speed difference scale to indicate the current speed difference. For example, in FIG. 3, the bar 42 indicates that the current speed difference is −3 km/h.

Scanning positions in the direction Y on the display screen of the liquid crystal display unit 111 are switched sequentially by an output from the Y driver 109. The Y driver 109 switches sequentially the scanning positions in the direction Y in synchronism with a vertical synchronizing signal which is outputted from the graphic controller 106.

The X driver 108 switches sequentially scanning positions in the direction X on the display screen of the liquid crystal display unit 111 in synchronism with a horizontal synchronizing signal which is outputted from the graphic controller 106. Additionally, the X driver 108 gives image data of the colors of RGB which is outputted from the graphic controller 106 to display cells in a scanning position to thereby control the contents of display on the screen.

The graphic controller 106 displays various graphic elements on the screen of the liquid crystal display unit 111 according to various commands which are inputted thereinto from the microcomputer 101. In reality, the microcomputer 101 or the graphic controller 106 writes display data on the frame memory 107 which holds the contents of display for each pixel to draw a graphic. In addition, the graphic controller 106 generates a vertical synchronizing signal and a horizontal synchronizing signal for two-dimensionally scanning the screen of the liquid crystal display unit 111 and gives display data stored in corresponding addresses on the frame memory 107 to the liquid crystal unit 111 at timings synchronized with those synchronizing signals.

The direct-current power supplied from the vehicle side positive power supply line (+B) is inputted to the LCD power supply unit 110, which generates a predetermined direct-current power which is necessary for the liquid crystal display unit 111 to display the information thereon.

Next, a specific operation of the display system 100 will be described.

Figure 2:
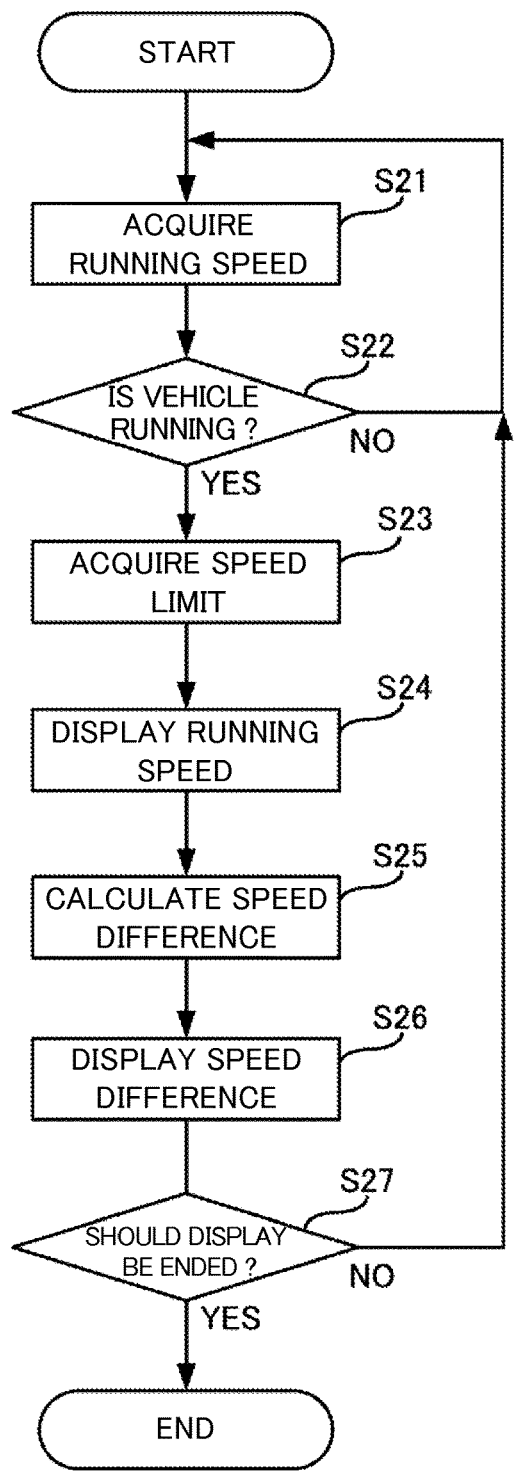
FIG. 2 is a flowchart showing a processing routine in displaying speed information.

FIG. 2 shows a processing routine in displaying speed information by a flowchart.

Firstly, the driver turns on the ignition switch. The microcomputer 101 to which the direct-current voltage (Vcc) is supplied starts displaying various pieces of information including speed information in the first display area 31 to the fourth display area 34. Hereinafter, a display control will be described which is to be executed in the first display area 31 and the fourth display area 34 to display speed information.

In step S21, the microcomputer 101 acquires running speed information which is information representing a value of the current running speed of the vehicle via the interface 104.

In step S22, the microcomputer 101 determines whether or not the vehicle is running. More specifically, the microcomputer 101 determines whether or not a value of a running speed which is grasped according to the running speed information which it receives via the interface 104 is larger than a predetermined threshold. If the microcomputer 101 determines from the results of the determination that the vehicle is running, the microcomputer 101 executes an operation in step S23. On the other hand, if the microcomputer 101 determines from the results of the determination that the vehicle is not running (that is, the vehicle is being stopped), the microcomputer 101 executes an operation in step S21 again. Namely, when the microcomputer 101 determines that the vehicle is being stopped, the microcomputer 101 does not execute an updating operation of updating the display of a running speed and an updating operation of updating the display of a speed difference, as described by the following.

In step S23, the microcomputer 101 acquires speed limit information representing a value of a speed limit set for an area where the vehicle is currently running via the interface 104.

In step S24, the microcomputer 101 outputs the speed scale 35 and the needle 36 onto the first display area 31 so that the speed scale 35 and the needle 36 produce a display which corresponds to the value of the current running speed of the vehicle which is grasped according to the running speed information which the microcomputer 101 acquired in step S21.

In step S25, the microcomputer 101 subtracts the value of the speed limit from the current running speed of the vehicle to thereby calculate a value of the current speed difference.

In step S26, the microcomputer 101 outputs the speed difference scale 41 and the bar 42 onto the fourth display area 34 so that the speed difference scale 41 and the bar 42 produce a display which corresponds to the value of the current speed difference which was calculated in step S25.

In step 27, the microcomputer 101 waits for an operation of completing the display of the speed information. Specifically, if the ignition switch is on, the microcomputer 101 repeats the operation in step S21. On the other hand, if the ignition switch is off and the direct-current voltage (Vcc) is not supplied, the microcomputer 101 stops the outputs to the first display area 31 and the fourth display area 34 and ends the display of the speed information.

By executing the series of operations described above, a value of a difference between the current running speed of the vehicle and the speed limit set for the area where the vehicle is currently running is displayed on the fourth display area 34 on the display screen of the liquid crystal display unit 111 as the information representing a deviation amount of the current running speed of the vehicle from the speed limit of the area where the vehicle is currently running. Additionally, the value of the current running speed of the vehicle is displayed on the first display area 31.

Modified Example

Figure 4:
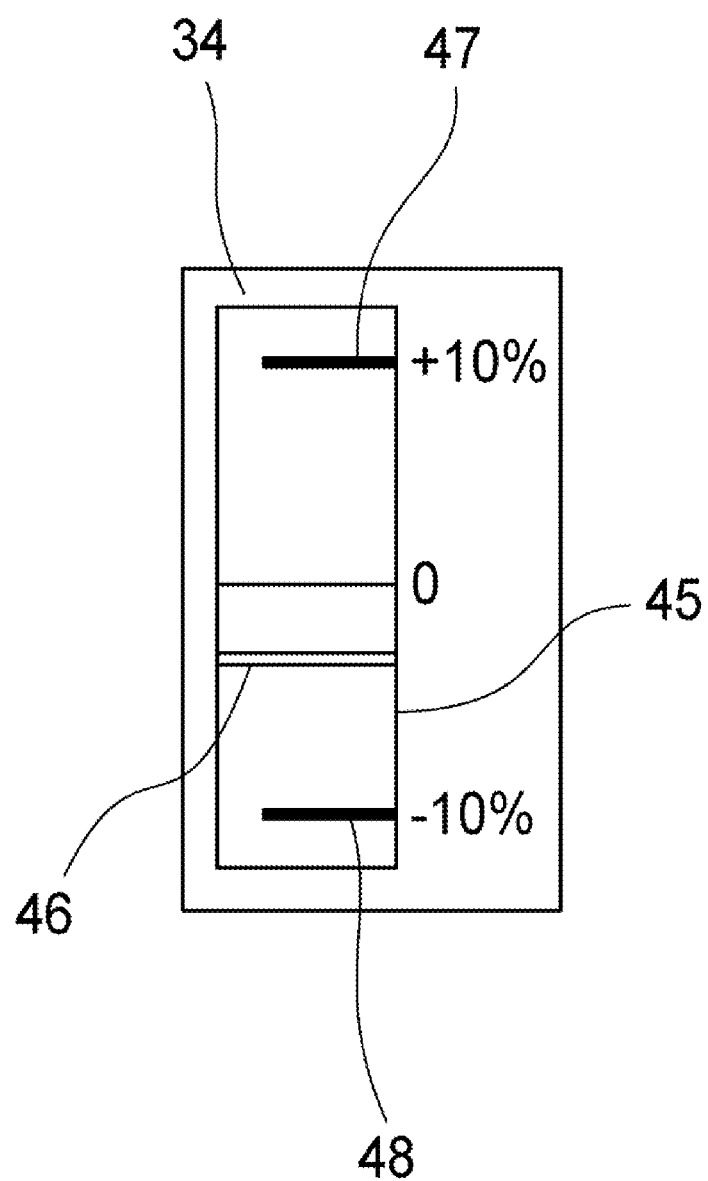
FIG. 4 is a view showing an example of a display on a fourth display area 34 according to a modified example.

Next, referring to FIG. 4, a modified example will be described in which the display mode of the fourth display area 34 is changed. FIG. 4 is a view showing an example of a display on a fourth display area 34 according to the modified example.

In the modified example, a value of a ratio of a difference between the current running speed of a vehicle and a speed limit set for an area where the vehicle is currently running (that is, a speed difference) to the speed limit (that is a speed difference ratio) is displayed as a deviation amount of the current running speed from the speed limit.

In the modified example, a value of the speed difference ratio is displayed on a fourth display area 34 as the deviation amount by a scale display which includes a scale and a bar which points a portion of the scale. Namely, in the modified example, as shown in FIG. 4, a speed difference ratio scale 45 and a bar 46 are displayed on the fourth display area 34. The vertically extending speed difference ratio scale 45 displays the value of the speed difference in percent as a unit. In the speed difference ratio scale 45, a point where the speed difference ratio is zero is disposed at the center of the scale as an origin, and a scale division 47 indicating that the speed difference ratio is +10 percent is provided at an upper portion, while a scale division 48 indicating that the speed difference ratio is −10 percent is provided at a lower portion of the scale. The bar 46 points a portion on the speed difference ratio scale 45 to indicate the current speed difference ratio. For example, in FIG. 4, the bar 46 indicates that the current speed difference ratio is on the order of −3 percent.

Then, in using the display mode of the modified example is used, when in operation, in step S25 shown in FIG. 2, a value which is obtained by dividing the value of the difference between the current running speed of the vehicle and the speed limit by the value of the speed limit is calculated as a value of the current speed difference ratio. In step S26, the speed difference ratio scale 45 and the bar 46 should be outputted onto the fourth display area 34 so that the speed difference ratio scale 45 and the bar 46 provide a display which corresponds to the value of the current speed difference ratio calculated.

In this way, the value of the ratio of the difference between the running speed of the vehicle and the speed limit set for the area where the vehicle is currently running to the speed limit is displayed on a display screen of a liquid crystal display unit 111 according to the modified example as the information representing a deviation amount of the running speed from the speed limit.

Hereinafter, the function and advantage of the display system 100 according to the embodiment will be described.

The display system 100 according to the embodiment is the display device which is installed in the vehicle and includes the liquid crystal display unit 111 as the display unit which outputs the information representing the deviation amount of the current running speed of the vehicle from the speed limit set for the area where the vehicle is currently running.

By including the liquid crystal display unit 111, the driver can easily grasp the deviation amount of the current running speed from the speed limit by looking at the liquid crystal display unit 111.

As a result of this, according to the display system 100 according to the embodiment, the driver can be encouraged to drive the vehicle in such a way as to keep the speed limit, whereby the safety drive can be promoted.

Additionally, in the display system 100 according to the modified example, the liquid crystal display unit 111 outputs the speed difference ratio which is the ratio of the difference between the running speed and the speed limit to the speed limit.

By doing so, the driver can easily grasp the deviation amount of the current running speed from the speed limit via the ratio based on the speed limit.

In the display system 100 according to the modified example, the liquid crystal display unit 111 outputs the speed difference ratio through the scale display in which the point where the speed difference ratio is zero is used as the origin.

By doing so, the driver can instinctively the value of the speed difference ratio.

In addition, in the display system 100 according to the embodiment, the liquid crystal display unit 111 includes the first display area 31 which is the running speed display area which outputs the information representing the current running speed of the vehicle and the fourth display area 34 which is the deviation amount display area which outputs the information representing the deviation amount.

By visibly recognizing the liquid crystal display unit 111 including the first display area 31 and the fourth display area 34, the driver can grasp both the value of the current running speed and the deviation amount of the running speed from the speed limit.

The technical scope of the invention is not limited to the embodiment which has been described heretofore. The embodiment can by accompanied by various modifications and/or improvements which are made within the technical scope of the invention.

For example, in the display system 100 according to the embodiment, while the value of the speed difference or the speed difference ratio is described as being displayed through the scale display in which the bar points a portion of the scale on the fourth display area 34, a display using a rotating needle or a numerical display may be adopted.

Additionally, in the display system 100 according to the embodiment, while the liquid crystal display unit 111 is described as being provided as the display unit, there will be no problem even in the event that a configuration is adopted in which the display system is a display system which uses a head-up display in which various pieces of information are displayed on a windshield of a vehicle or a combiner and the windshield or the combiner is used as a display unit.

In the display system 100 according to the embodiment, while the display unit 111 is described as having the different display areas such as the first display area 31, the second display area 32, the third display area 33 and the fourth display area 34, the configuration of the display areas is not limited thereto. A configuration in which the liquid crystal display unit 111 does not have the second display area 32 and the third display area 33 may be adopted, or a configuration in which the liquid crystal display unit 111 has only the fourth display area 34 may be adopted.

The display system according to the invention is useful in providing a display system which facilitates the grasping of a deviation of the current running speed of a vehicle from a speed limit.

What is claimed is:

1. A display system installed in a vehicle, comprising:
a display unit for displaying a deviation amount of a current running speed of the vehicle from a speed limit set for an area where the vehicle is currently being driven, wherein
the display unit outputs a value of the deviation amount as a ratio of a speed difference to the speed limit on a scale display in which a point where the ratio is zero is used as an origin, with a scale division indicating a predetermined range of values of the deviation amount, where the speed difference is the speed limit subtracted from the current running speed, and wherein
the display unit has a running speed display area which outputs information representing the current running speed of the vehicle and a deviation amount display area which outputs the deviation amount juxtaposed with the running speed display area.

* * * * *